(12) United States Patent
Sikka et al.

(10) Patent No.: US 12,052,994 B2
(45) Date of Patent: Aug. 6, 2024

(54) METHODS FOR CONTROLLING BLACK SIGATOKA IN BANANAS USING PONGAMIA OIL AND FORMULATIONS THEREOF

(71) Applicant: Terviva, Inc., Alameda, CA (US)

(72) Inventors: Naveen Sikka, Oakland, CA (US); Sudhir Rani, Oakland, CA (US); William Grant Aldridge, Whitsett, NC (US)

(73) Assignee: Terviva, Inc., Alameda, CA (US)

( * ) Notice: Subject to any disclaimer, the term of this patent is extended or adjusted under 35 U.S.C. 154(b) by 458 days.

(21) Appl. No.: 17/427,179

(22) PCT Filed: Feb. 3, 2020

(86) PCT No.: PCT/US2020/016385
§ 371 (c)(1),
(2) Date: Jul. 30, 2021

(87) PCT Pub. No.: WO2020/160536
PCT Pub. Date: Aug. 6, 2020

(65) Prior Publication Data
US 2022/0125059 A1    Apr. 28, 2022

Related U.S. Application Data

(60) Provisional application No. 62/800,540, filed on Feb. 3, 2019.

(51) Int. Cl.
*A01N 65/20*    (2009.01)
*A01N 25/04*    (2006.01)
*A01P 3/00*    (2006.01)

(52) U.S. Cl.
CPC ............ *A01N 65/20* (2013.01); *A01N 25/04* (2013.01); *A01P 3/00* (2021.08)

(58) Field of Classification Search
CPC ............ A01N 65/20; A01N 25/04; A01P 3/00
See application file for complete search history.

(56) References Cited

U.S. PATENT DOCUMENTS

| 1,504,588 A | 8/1924 | Tunison |
| 2,200,391 A | 5/1940 | Freeman |

(Continued)

FOREIGN PATENT DOCUMENTS

| CN | 1589644 A | 3/2005 |
| CN | 1762406 A | 4/2006 |

(Continued)

OTHER PUBLICATIONS

Misra et al, Integrated management approach against sigatoka leaf spot of banana, 2007, vol. 45, No. 1, pp. 104-106, Abstract only, 1 page. (Year: 2007).*

(Continued)

*Primary Examiner* — Trevor Love
(74) *Attorney, Agent, or Firm* — Morrison & Foerster LLP

(57) ABSTRACT

The present disclosure relates to methods for controlling black sigatoka, or black leaf streak, disease in banana plants using *pongamia* oil and formulations thereof. The present disclosure also provides formulations comprising *pongamia* oil, including emulsions and emulsifiable concentrates, for use in the control of black sigatoka.

15 Claims, 2 Drawing Sheets

(56) References Cited

U.S. PATENT DOCUMENTS

| | | | |
|---|---|---|---|
| 2,548,434 | A | 4/1951 | Leaders |
| RE30,386 | E | 8/1980 | Brandt et al. |
| 4,219,469 | A | 8/1980 | Kadan et al. |
| 4,221,731 | A | 9/1980 | Short et al. |
| 4,543,264 | A | 9/1985 | Stahel |
| 4,646,631 | A | 3/1987 | Ward |
| 4,785,726 | A | 11/1988 | Wear et al. |
| 5,437,885 | A | 8/1995 | Lusas et al. |
| 8,481,768 | B2 | 7/2013 | Sarangan et al. |
| 8,690,967 | B2 | 4/2014 | Anitescu et al. |
| 9,328,312 | B2 | 5/2016 | Kumar et al. |
| 9,725,664 | B2 | 8/2017 | Anitescu et al. |
| 9,914,897 | B2 | 3/2018 | Kumar et al. |
| 10,577,558 | B2 | 3/2020 | Boerner et al. |
| 2004/0047972 | A1 | 3/2004 | Wasche et al. |
| 2004/0121058 | A1 | 6/2004 | Jayalekshmy et al. |
| 2004/0156920 | A1 | 8/2004 | Kane |
| 2007/0099278 | A1 | 5/2007 | Aare |
| 2007/0154579 | A1 | 7/2007 | Palu et al. |
| 2007/0166417 | A1 | 7/2007 | Palu et al. |
| 2008/0233202 | A1 | 9/2008 | Wurms et al. |
| 2011/0281017 | A1 | 11/2011 | Brooker |
| 2013/0296374 | A1 | 11/2013 | Owen et al. |
| 2014/0196359 | A1 | 7/2014 | Anitescu et al. |
| 2016/0031950 | A1 | 2/2016 | Jaramillo Freydell et al. |
| 2016/0122687 | A1 | 5/2016 | Carbone et al. |
| 2017/0280756 | A1 | 10/2017 | Jaramillo Freydell et al. |
| 2018/0042266 | A1 | 2/2018 | Hetherington et al. |
| 2018/0207070 | A1 | 7/2018 | Bernoud et al. |
| 2019/0269594 | A1 | 9/2019 | Gadgil et al. |
| 2022/0000146 | A1 | 1/2022 | Sikka et al. |
| 2022/0369662 | A1 | 11/2022 | Sikka et al. |
| 2023/0148625 | A1 | 5/2023 | Astwood et al. |
| 2023/0148638 | A1 | 5/2023 | Astwood et al. |
| 2023/0217944 | A1 | 7/2023 | Dragull et al. |

FOREIGN PATENT DOCUMENTS

| | | |
|---|---|---|
| CN | 102372720 A | 3/2012 |
| CN | 103194497 A | 7/2013 |
| CN | 104892620 A | 9/2015 |
| CN | 108024950 A | 5/2018 |
| EP | 4125370 A1 | 2/2023 |
| IN | 1826/DEL/2006 A1 | 4/2008 |
| IN | 1074/KOL/2008 A | 8/2008 |
| IN | 2010/DEL/2009 A | 4/2011 |
| IN | 0420/MUM/2012 A | 11/2013 |
| IN | 1084/CHE/2009 A | 1/2014 |
| IN | 3616/DEL/2012 A | 8/2014 |
| IN | 0287/DEL/2014-4 | 7/2016 |
| IN | 2381/DEL/2015 A | 2/2017 |
| JP | 2016013076 A | 1/2016 |
| JP | 2018521079 A | 8/2018 |
| RU | 2529898 C2 | 10/2014 |
| RU | 2700094 C1 | 9/2019 |
| WO | WO-2001076715 A2 | 10/2001 |
| WO | WO-2002054884 A1 | 7/2002 |
| WO | WO-2004057976 A1 | 7/2004 |
| WO | WO-2008120223 A2 | 10/2008 |
| WO | WO-2011027362 A2 | 3/2011 |
| WO | WO-2013096993 A1 | 7/2013 |
| WO | WO-2016042001 A1 | 3/2016 |
| WO | WO-2017013264 A1 | 1/2017 |
| WO | WO-2017041776 A1 | 3/2017 |
| WO | WO-2017057600 A1 | 4/2017 |
| WO | WO-2019195947 A1 | 10/2019 |
| WO | WO-2020072827 A1 | 4/2020 |
| WO | WO-2021067698 A1 | 4/2021 |
| WO | WO-2021202994 A1 | 10/2021 |
| WO | WO-2021202996 A1 | 10/2021 |
| WO | WO-2021202998 A1 | 10/2021 |

OTHER PUBLICATIONS

Akram et al., (2021). "Pongamia pinnata: an updated review on its phytochemistry and pharmacological uses," Pharm. Pharmacol. Int. J., 9(5):194-199.

Altemimi et al., (2017). "Phytochemicals: Extraction, Isolation, and Identification of Bioactive Compounds from Plant Extracts," Plants, 6(42), 23 pages.

Aneela et al., (2011). "Acute oral toxicity studies of Pongamia pinnata and Annona Squamosa on albino Wistar rats," Int. J. Res. Pharm. Chem., 1(4):820-824.

Ansari et al., (2019). "Statistical approach towards optimization of extraction process of karanjin from Pongamia pinnata seeds," Pharmacognosy Magazine, 419-425. Abstract Only.

Araujo et al., (2010). "High-fat diet increases thyrotropin and oxygen consumption without altering circulating 3,5,3'-triiodothyronine (T3) and thyroxine in rats: the role of iodothyronine deiodinases, reverse T3 production, and whole-body fat oxidation," Endocrinol, 151:3460-3469.

Avula et al., (2009). "Quantitative Determination of Flavonoids by col. High-Performance Liquid Chromatography with Mass Spectrometry and Ultraviolet Absorption Detection in Artemisia afra and Comparative Studies with Various Species of Artemisia Plants," Journal of AOAC International, 92(2):633-644.

Baki et al., (2007). "Sub-Acute toxicological studies of pongamol isolated from Pongamia pinnata," Res. J. Med. Med. Sci., 2(2):53-57.

Bartlett, (1937). "Properties of sufficiency and statistical tests," Proceedings of the Royal Society of London, 160(901):268-282.

Da Silva, (2021). "Feeding the world sustainably," available online at <https://www.un.org/en/chronicle/article/feeding-world-sustainably>, 2 pages.

Database Biosis, (1990). "Database accession No. PREV199090106184; Natanam et al, The Feeding Value of Karanja India Pongamia-Glabra Vent Oil For White Leghorn Pullets," Indian Veterinary Journal, 67(4):335-338, 2 pages.

Database Biosis, (1997). "Database accession No. PREV199800011011; Dhara et al., "Deoiled Karanja (Pongamia glabra Vent.) cake in the ration of Japanese quail,"" Indian Journal of Poultry Science, 32(2):132-136, 1 page.

De et al., (1998). "Nutritional quality of detoxified karanja (Pongamia glabra) oil," Fett/Lipid, 100:48-51.

De et al., (2009). "Optimization of solvent requirement for refining of karanja (Pongamia glabra) oil by liquid-liquid extraction," Journal of Scientific & Industrial Research, 68:319-324. Abstract Only, 2 pages.

Di Dalmazi et al., (2021). "Plant constituents and thyroid: a revision of the main phytochemicals that interfere with thyroid function," Food Chem. Toxicol., 152:112158, 13 pages.

Directive 2009/32/EC of the European Parliament and of the Council (Apr. 23, 2009) on the approximation of the laws of the Member States on extraction solvents used in the production of foodstuffs and food ingredients, 12 pages.

Dundford, (2016). "Edible Oil Quality," Available online at <https://extension.okstate.edu/fact-sheets/edible-oil-quality.html>, 4 pages.

Dunn, (1964). "Multiple contrasts using rank sums," Technometrics, 6:241-252.

Dunnett, (1964). "New tables for multiple comparisons with a control," Biometrics, 20(3):482-491.

Dutta et al., (2012). "Use of Pongamia glabra (karanj) and Azadirachta indica (neem) seed cakes for feeding livestock," Biofuel coproducts as livestock feed—opportunities and challenges, pp. 379-402.

Dutton et al., (1954). "Countercurrent fractionation of lipids," Progress in the Chemistry of Fats and Other Lipids, 2:292-325.

El-Sayed et al., (2020). "Effect of high-fat diet-induced obesity on thyroid gland structure in female rats and the possible ameliorating effect of metformin therapy," Folia Morphol., 79(3):476-488.

EPA, (2002). "Health effects test guidelines OPPTS 870.1100, Acute Oral Toxicity," rev. EPA 712-C-02-190, Dec. 2002, 37 pages.

Extended European Search Report and Opinion received for European Patent Application No. 19869239.4 mailed on May 10, 2022, 12 pages.

(56) References Cited

OTHER PUBLICATIONS

Extended European Search Report and Opinion received for European Patent Application No. 20870766.1 mailed on Oct. 10, 2023, 15 pages.
Extended European Search Report and Opinion received for European Patent Application No. 21779137.5 mailed on Nov. 28, 2023, 16 pages.
Extended European Search Report and Written Opinion received for European Patent Application No. 21779138.3 mailed on Dec. 7, 2023, 15 pages.
Extended European Search Report and Written Opinion received for European Patent Application No. 21781819.4 mailed on Dec. 22, 2023, 14 pages.
Food and Agriculture Organization of the United Nations (FAO) et al., (2020). "The State of Food Security and Nutrition in the World 2020. Transforming Food Systems for Affordable Healthy Diets," available online at <https://www.unicef.org/reports/state-of-food-security-and-nutrition-2020>, 320 pages.
Fu et al., (2021). "Fuel properties of Pongamia (*Milletia pinnata*) seeds and pods grown in Hawaii," ACS Omega, 6:9222-9233, 12 pages.
Gandhi et al., (2000). "Red cell haemolysis test as an in vitro approach for the assessment of toxicity of karanja oil," Toxicology in Vitro, 14:513-516.
Ghosh et al., (2018). "Role of nitric oxide scavenging activity of Karanjin and Pongapin in the treatment of Psoriasis," 3 Biotech, 8(8):338, 4 pages.
Gore et al., (2008). "Determination of Pongamol and Karanjin in Karanja Oil By Reverse Phase HPLC," Analytical Letters, 33(2):337-346.
Gupta et al., (1981). "Biological evaluation of karanj (*Pongamia glabra*) cake," Indian J. Anim. Health, 20:75-77.
Housman et al., (2020). "Expeller-pressed and solvent-extracted Pongamia seedcake as a protein supplement for cattle consuming a basal diet of forage," Animal Feed Science and Technology, 266:114521, 12 pages.
Husna et al., (2017). "Performance of broiler fed on diet containing Koroch (*Pongamia pinnata*) seed cake," Bangladesh J. Anim. Sci., 46(2):88-94.
International Search Report and Written Opinion for International Patent Application No. PCT/US2019/54579, mailed on Dec. 10, 2019, 13 pages.
International Search Report and Written Opinion for International Patent Application No. PCT/US2020/016385, mailed on Apr. 16, 2020, 12 pages.
International Search Report and Written Opinion for International Patent Application No. PCT/US2020/053945, mailed on Dec. 30, 2020, 7 pages.
International Search Report and Written Opinion for International Patent Application No. PCT/US2021/025576, mailed on Aug. 6, 2021, 14 pages.
International Search Report and Written Opinion for International Patent Application No. PCT/US2021/025578, mailed on Aug. 6, 2021, 12 pages.
International Search Report and Written Opinion for International Patent Application No. PCT/US2021/25572, mailed on Aug. 4, 2021, 11 pages.
Interstate Standard GOST 1129-2013. (2019). "Sunflower Oil, Specifications," M.: Standartinform, 40 pages.
Interstate Standard GOST ISO 9832-2015. (2019). "Animal and Vegetable Fats and Oils, Determination of residual technical hexane content (ISO 9832:2002, UT)," M.: Standartinform, 32 pages.
Kadirvel et al., (1989). "The Effect of Kernels of Karanja (*Pongamia glabra* Vent) on Growth and Feed Efficiency in Broiler Chicks to 4 Weeks of Age," Animal Feed Science and Technology, 25:201-206.
Kesari et al., (2011). "Coordinated changes in storage proteins during development and germination of elite seeds of Pongamia pinnata, a versatile biodiesel legume," AoB Plants, plr026, 16 pages.
Khan et al., (2015). "Optimization of Process Conditions for Isolation of Leaf Protein Concentrate from Pongamia pinnata and its Proximate Nutritional Composition," IOSR Journal of Applied Chemistry, 8:24-33.
Kruskal et al., (1952). "Use of ranks in one-criterion variance analysis," J. Am. Stat. Assoc., 47:583-621.
Kumar et al., (2017). "Green solvents and technologies for oil extraction from oilseeds," Chemistry Central Journal, 11:9, 7 pages.
Kumar et al., (2018). "Microwave assisted extraction of oil from pongamia pinnata seeds," Materials Today: Proceedings, 5:2960-2964.
Liu et al., (2017). "The History, Current Status and Prospects of Plant Extracts as Commercial Botanical Insecticides and "Farming Products" for Insect Control," World Pesticides, 39(1):9-13. English translation.
Mahli et al., (1989). "Pharmacological effects of karanjin and pongamol (from seed oil of Pongamia pinnata)," Indian J. Anim. Sci., 59(6):657-660.
Mandal et al., (1974). "Studies on the utilization of karanja (*Pongamia glabra*) oil cake in poultry rations," Indian J. Poult. Sci., 9:141-147.
Mandal et al., (1984). "Chemical and Nutritional Evaluation of Pongamia glabra Oil and Acacia auriculaeformis Oil," JAOCS, 61(9):1447-1449.
Mandal et al., (1985). "Effect of Refined Hydrogenated Karanja Oil on Lipid Metabolism in Adult Male Albino Rats," Acta Alimentaria, 14(1):3-13.
Mandal et al., (1985). "Protease Inhibitors and in vitro Protein Digestibility of Defatted Seed Cakes of Akashmoni and Karanja," JAOCS, 62(7):1124-1126.
Mann et al., (1947). "On a test whether one of two random variables is stochastically larger than the other," Ann. Math. Stat., 18:50-60.
Marone et al., (2022). "Safety and toxicologic evaluation of Edible Pongamia Oil: A novel food ingredient," Food and Chemical Toxicology, 166:113213, 11 pages.
Moudgal et al., (1958). "Studies on goitrogenic agents in food. III. Goitrogenic action of some glycosides isolated from edible nuts," J. Nutri., 66:291-303.
Natanam et al., (1989). "Chemical Composition of Karanja (*Pongamia glabra* Vent) Kernel and Cake as Animal Feed," Indian J. Anim. Nutr., 6(3):270-273.
Natanam et al., (1989). "The Effect of Karanja (*Pongamia glabra* Vent) cake on the performance of White Leghorn pullets," Animal Feed Science and Technology, 27:89-93.
National Research Council, (1995). "Chapter 2: Nutrient Requirements of the Laboratory Rat," Nutrient Requirements of Laboratory Animals: Fourth Revised Edition, pp. 11-79.
Natural Sourcing, (2018). "Karanja Oil," Available online at <https://www.praannaturals.com/downloads/specsheets/SPEC_Organic_Karanja_OILORGOILKARANJACPIN1056.pdf>, 1 page.
Nirmal et al., (2007). "Anthelmintic activity of Pongamia glabra," Songklanakarin Journal of Science and Technology, 29(3):755-757.
OECD, (1997). OECD Guidelines for Testing of Chemicals, Test No. 471: Bacterial Reverse Mutation Test, available online at <https://www.oecd-ilibrary.org/environment/test-no-471-bacterial-reverse-mutation-test_9789264071247-en>, 11 pages.
OECD, (1998). "OECD Series on Principles of Good Laboratory Practice and Compliance Monitoring—No. 1," ENV/MC/CHEM(98)17, 41 Pages.
OECD, (2000). "Guidance Document on the Recognition, Assessment and Use of Clinical Signs as Humane Endpoints for Experimental Animals Used in Safety Evaluation," ENV/JM/MONO(2000)7, 39 pages.
OECD, (2002). "OECD Series on Principles of Good Laboratory Practice and Compliance Monitoring, No. 13," ENV/JM/MONO(2002)9, 17 pages.
OECD, (2008). "OECD Guidelines for the Testing of Chemicals, Test No. 407: Repeated Dose 28-day Oral Toxicity Study in Rodents", available online at <https://www.oecd-ilibrary.org/environment/test-no-407-repeated-dose-28-day-oral-toxicity-study-in-rodents_9789264070684-en>, 13 pages.
OECD, (2016). "OECD Guidelines for Testing of Chemicals, Test No. 475: Mammalian Bone Marrow Chromosome Aberration Test," available online at <https://www.oecd.org/env/ehs/testing/test-no-

(56) References Cited

OTHER PUBLICATIONS 475-mammalian-bone-marrow-chromosomal-aberration-test-9789264264786-en.htm>, 18 pages.

OECD, (2018). "OECD Guidelines for the Testing of Chemicals, Test No. 408: Repeated Dose 90-day Oral Toxicity Study in Rodents," available online at <https://www.oecd-ilibrary.org/environment/test-no-408-repeated-dose-90-day-oral-toxicity-study-in-rodents_9789264070707-en>, 16 pages.

Official Journal of the European Union, (2010). "Directive 2010/63/EU of the European Parliament of the Council of Sep. 22, 2010 on the Protection of Animals Used for Scientific Purposes," L276:33-79.

Official Journal of the European Union, (2017). "Commission Regulation (EU) No. 2017/735, Annex B, 'Mammalian Bone Marrow Chromosomal Aberration Test,'" L 112:39-51.

Osman et al., (2009). "Pongamia seed cake as a valuable source of plant nutrients for sustainable agriculture," Ind. J. Fert., 5(2):25-32.

Panda et al., (2006). "Quantification of Karanjin, Tannin and Trypsin Inhibitors in Raw and Detoxified Expeller and Solvent Extracted Karanj (*Pongamia glabra*) Cake," Asian-Aust. J. Anim. Sci., 19(12):1776-1783.

Panpraneecharoen et al., (2014). "Variability of Oil Content, Fatty Acid Composition and Karanjin Content in Pongamia pinnata and Its Relationship with Biodiesel Quality," Annual Research & Review in Biology, 4(14):2283-2294.

Paswan, (2012). "Thesis: Studies on Detoxification and Nutritive Potential of Karanj (*Pongamia glabra*) Cake," Deemed University Indian Veterinary Research Institute, 203 pages.

Patel et al., (2015). "Simple, Efficient and Economic Method For Isolation and Analysis of Karanjin and Pongamol from Karanja Seed Oil and Screening of Antimicrobial Potential," International Journal of Pharmacy and Pharmaceutical Sciences, 7(7):248-252.

Pavithra et al., (2010). "Seed Protein Profiling of *Pongamia pinnata* (L.) Pierre for Investigating Inter and Intra-specific Population Genetic Diversity," International Journal of Science and Nature, 1(2):246-252.

Pavithra et al., (2012). "Oil, Fatty Acid Profile and Karanjin Content in Developing *Pongamia pinnata* (L.) Pierre Seeds," J Am Oil Chem Soc., 89:2237-2244.

Prabhu et al., (2002). "Quantification of Karanjin Using High Performance Liquid Chromatography in Raw and Detoxified Karanj (*Pongamia glabra* vent) Seed Cake," Asian-Aust. J. Anim. Sci., 15(3):416-420.

Raj et al., (2016). "Effect of incorporation of detoxified karanja (*Pongamia pinnata*) and neem (*Azadirachta indica*) seed cakes in total mixed rations on milk yield, composition and efficiency in crossbred dairy cows," Indian J. Anim. Sci., 86(4):489-492.

Ravi et al., (2000). "Performance of lambs fed expeller pressed and solvent extracted karanj (*Pongamia pinnata*) oil cake," Animal Feed Science and Technology, 88:121-128.

Sangwan et al., (2010). "A Review on *Pongamia pinnata* (L.) Pierre: A Great Versatile Leguminous Plant," Nature and Science, 8(11):130-139.

Sasmal et al., (1997). "Preliminary study on the effect of purified Pongamia oil on liver and kidney functions in rats," Fitoterapia, 68(1):35-38.

Search Report received for Chinese Patent Application No. 2020800114843 issued on Apr. 26, 2022, 4 pages. English translation.

Shao et al., (2014). "Dietary high-fat lard intake induces thyroid dysfunction and abnormal morphology in rats," Acta Pharmacol. Sin., 35:1411-1420.

Shapiro et al., (1965). "An analysis of variance test for normality (complete samples)," Biometrika, 52(3-4):591-611.

Shejawal et al., (2014). "Bioavailability of karanjin from *Pongamia pinnata* L. in Sprague Dawley rats using validated RP-HPLC method," J. Appl. Pharmaceut. Sci., 4(3):10-14.

Speakman, (2019). "Use of high-fat diets to study rodent obesity as a model of human obesity," Int. J. Obes., 43:1491-1492.

Sreedevi et al., (2009). "Participatory research and development to evaluate Pongamia seed cake as a source of plant nutrient in integrated watershed management," J. Sat Agric. Res., 7:1-13.

Srivastava et al., (1990). "Utilisation of deoiled karanj (*Pongamia glabra*) cake in kid grower rations," Indian J. Anim. Nutr., 7:15-20.

Suryawanshi et al., (2018). "Formulation and Evaluation of *Pongamia pinnata* (Karanj) Seed Oil In Water Nanoemulsion," International Journal of Pharmacy and Biological Sciences, 8(4):488-494.

Susarla et al., (2012). "A method for isolation of karanjin from the expelled cake of Pongamia glabra," European Journal of Lipid Science and Technology, 114:1097-1101.

Szalay, (2015). "What are Flavonoids?" Available online at <https://www.livescience.com/52524-flavonoids.html>, 5 pages.

Thakur et al., (2021). "Karanj (*Pongamia pinnata*)—an ayurvedic and modern overview," Asian J. Pharmaceut. Clin. Res., 14(6):14-21.

U.S. Food and Drug Administration (FDA), (2000). "Redbook 2000, IV.C.1.a. Bacterial Reverse Mutation Test, Toxicological Principles for the Safety Assessment of Food Ingredients," available online at <https://www.fda.gov/regulatory-information/search-fda-guidance-documents/redbook-2000-ivc1a-bacterial-reverse-mutation-test>, 15 pages.

U.S. Food and Drug Administration (FDA), (2003). "Redbook 2000: IV.C.4.a. Subchronic Toxicity Studies with Rodents, Toxicological Principles for the Safety Assessment of Food Ingredients," available online at <https://www.fda.gov/regulatory-information/search-fda-guidance-documents/redbook-2000-ivc4a-subchronic-toxicity-studies-rodents>, 17 pages.

U.S. Food and Drug Administration (FDA), (2017). "Redbook 2000: IV.C.3.a. Short-Term Toxicity Studies with Rodents, Toxicological Principles for the Safety Assessment of Food Ingredients," available online at <https://www.fda.gov/regulatory-information/search-fda-guidance-documents/redbook-2000-ivc3a-short-term-toxicity-studies-rodents>, 17 pages.

U.S. Food and Drug Administration (FDA), (2024). "21 CFR Part 58, Good Laboratory Practice for Nonclinical Laboratory Studies," available online at <https://www.ecfr.gov/current/title-21/chapter-I/subchapter-A/part-58>, 19 pages.

United States Department of Agriculture (USDA), (2020). "DGA, Dietary Guidelines for Americans. 2020-2025," available online at <https://www.dietaryguidelines.gov/sites/default/files/2020-12/Dietary_Guidelines_for_Americans_2020-2025.pdf>, 164 pages.

Usharani et al., (2019). "*Pongamia pinnata* (L.): Composition and advantages in agriculture: A review," Journal of Pharmacognosy and Phytochemistry, 8:2181-2187.

Vinay et al., (2008). "Effect of detoxification on the functional and nutritional quality of proteins of karanja seed meal," Food Chemistry, 106:77-84.

Vismaya et al., (2010). "Extraction and recovery of karanjin: A value addition to karanja (*Pongamia pinnata*) seed oil," Industrial Crops and Products, 32:118-122.

Vismaya et al., (2011). "Gastroprotective Properties of Karanjin from Karanja (*Pongamia pinnata*) Seeds; Role as Antioxidant and H+, K+-ATPase Inhibitor," Evidence-Based Complementary and Alternative Medicine, 2011:747246, 10 pages.

Wang et al., (2015). "Chapter 11: Microwave Extraction," Bioactive component separation technology, p. 145. English translation.

Watson, (2021). "New Kid on the Plant-Based Block? TerViva to Commercialize Oils (2022) and Proteins (2023) from Pongamia Trees," available online at <https://www.foodnavigator-usa.com/Article/2021/04/29/New-kid-on-the-plant-based-block-TerViva-to-commercialize-oils-2022-and-proteins-2023-from-Pongamia-trees>, 6 pages.

Wilcoxon, (1945). "Individual comparisons by ranking methods," Biometrics Bull., 1:80-83.

Xu et al., (2012). Ionic Liquid-Based Microwave-assisted Extraction of Flavonoids from *Bauhinia championii* (Benth.) Benth., Molecules, 17:14323-14335.

Zhang et al., (2005). "Quantitative and qualitative analysis of flavonoids in leaves of Adinandra nitida by high performance liquid chromatography with UV and electrospray ionization tandem mass spectrometry detection," Analytica Chimica Acta, 532:97-104.

(56) References Cited

OTHER PUBLICATIONS

Zhang et al., (2018). "A high-fat diet rich in saturated and monounsaturated fatty acids induces disturbance of thyroid lipid profile and hypothyroxinemia in male rats," Mol. Nutr. Food Res., 62(6):1700599, 9 pages.

Dunnett, (1980). "Pairwise multiple comparisons in the unequal variance case," J. Am. Stat. Assoc., 75:796-800. Abstract Only.

Gaitan, (1990). "Goitrogens in food and water," Annu. Rev. Nutr., 10:21-39. Abstract Only.

Han et al., (2012). "Excess iodine and high fat diet combination modulates lipid profile, thyroid hormone, and hepatic LDLr expression values in mice," Biol. Trace Elem. Res., 147:233-239. Abstract Only.

Natanam et al., (1989). "The toxic effects of Karanj (*Pongamia glabra* vent) oil and cake on growth and feed efficiency in broiler chicks," Anim. Feed Sci. Technol., 27:95-100. Abstract Only.

Singh et al., (2021). "Karanjin," Phytochem., 183:112641. Abstract Only.

\* cited by examiner

METHODS FOR CONTROLLING BLACK SIGATOKA IN BANANAS USING PONGAMIA OIL AND FORMULATIONS THEREOF

CROSS REFERENCE TO RELATED APPLICATIONS

This application is a national stage application under 35 U.S.C. § 371 of International Application No. PCT/US2020/016385, filed internationally on Feb. 3, 2020, which claims priority to and the benefit of U.S. Provisional Patent Application Ser. No. 62/800,540, filed on Feb. 3, 2019, each of which is incorporated herein by reference in its entirety.

FIELD

The present disclosure relates generally to the control of black sigatoka, or black leaf streak, in bananas, and more specifically to the use of *pongamia* oil and formulations thereof for controlling black sigatoka.

BACKGROUND

Black sigatoka is an indiscriminate, highly damaging disease in banana plants, the spread of which has been observed in most major tropical climates where bananas are grown as crops, including Asia, West Africa, and South America. Caused by the fungus *Mycosphaerella fijiensis*, black sigatoka disease produces dark, necrotic lesions on the leaves of banana trees that are not only responsible for destroying leaf tissue and inhibiting the production of fruit but also ultimately lead to plant death. Even in instances in which infected banana plants survive, the fruit produced from these infected plants often suffer from disruptions to their maturation cycle—ripening prematurely and unevenly. As such, black sigatoka is a major contributor to losses in banana crop yields globally.

A variety of agricultural practices exist to control the severity of black sigatoka in infected crops and prevent further transmission to uninfected plants. Physical treatments to remove affected leaves and chemical treatments with fungicides are some such practices, though they can be highly cost- and labor-intensive. In addition, it has been observed that *Mycosphaerella fijiensis* has developed tolerance to some standard fungicides, which has added to the required frequency and dosing level of fungicide applications and which could lead to resistance of black sigatoka to these fungicides in the near future.

Thus, there is currently a need for new methods for controlling the infection and spread of black sigatoka in banana plants.

BRIEF SUMMARY

In one aspect, provided herein is a method for controlling black sigatoka in a banana plant, comprising applying *pongamia* oil to the banana plant.

In another aspect, provided herein is a method for controlling black sigatoka in a banana plant, comprising applying a formulation comprising *pongamia* oil to the banana plant.

In yet other aspects, provided are formulations comprising *pongamia* oil, and at least one inert ingredient. In some variations, the formulation is an emulsion.

In still other aspects, provided herein are emulsifiable concentrates comprising *pongamia* oil and one or more emulsifiers.

DESCRIPTION OF THE FIGURES

The present application can be understood by reference to the following description taken in conjunction with the accompanying figures.

DETAILED DESCRIPTION

Figure 1:
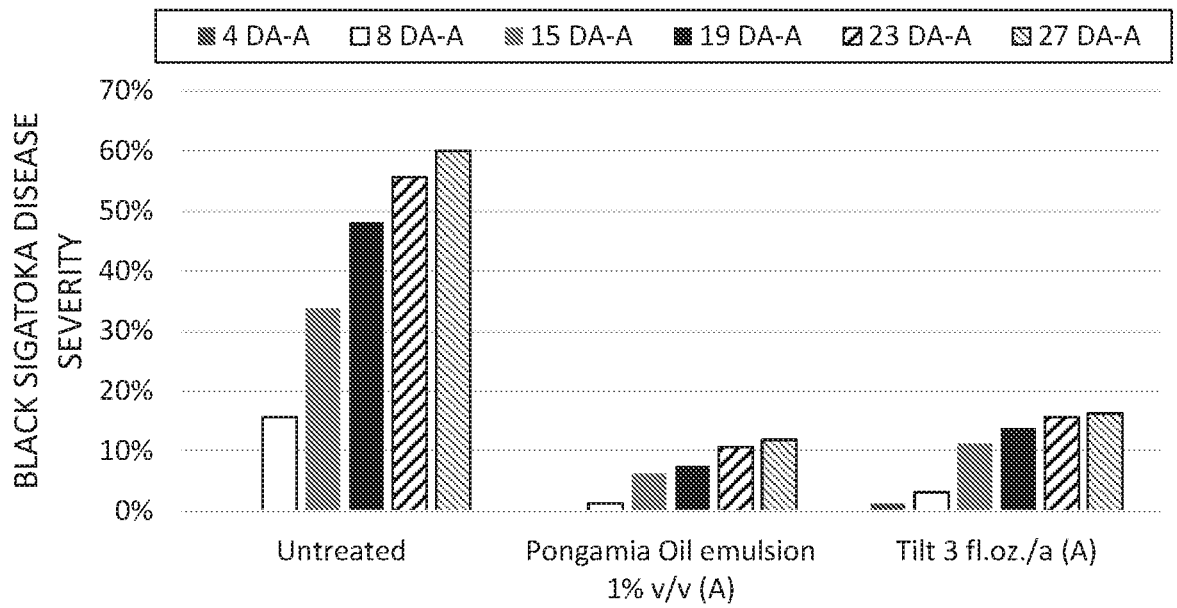
FIG. 1 depicts the average disease severity of black sigatoka on the banana plant foliage, rated on a 0-100% scale, observed for various treatments, including an untreated check (control), *pongamia* oil (emulsion) treatment, and a grower standard treatment (propiconazole).

The following description sets forth exemplary methods, parameters and the like. It should be recognized, however, that such description is not intended as a limitation on the scope of the present disclosure but is instead provided as a description of exemplary embodiments.

The present disclosure relates to methods for controlling black sigatoka in banana plants through the use of *pongamia* oil and formulations thereof, particularly emulsions of *pongamia* oil. It has been surprisingly observed that *pongamia* oil, a product of the oilseeds of *pongamia* tree (also known as karanja or *Millettia pinnata* or *Pongamia glabra*) is effective in the control of black sigatoka infection in banana plants. For example, in some variations, the use of *pongamia* oil, including the formulations described herein, can help to: (i) reduce disease severity of black sigatoka in infected banana plants by at least 40%, as compared to infected, untreated control banana plants; or (ii) increase the average percent control of disease severity over time in infected banana plants, by at least 40% as compared to infected, untreated control banana plants.

*Pongamia* Oil

In one aspect, provided herein is a method for controlling black sigatoka in banana plants, comprising applying *pongamia* oil to the banana plants. *Pongamia* trees contain various intrinsic chemical components that may be retained in the oil upon expression or removal of the *pongamia* oil from *pongamia* seeds. Among these chemical constituents in *pongamia* are a class of compounds known as furanoflavonoids. These furanoflavonoid compounds may contribute to the observed fungicidal effect against black sigatoka.

In some embodiments, the *pongamia* oil contains one or more furanoflavonoids. Furanoflavonoids may be further identified by sub-classes including, for example, flavones, flavonols (e.g., karanjin) and dibenzoylmethanes (e.g., pongamol). In certain embodiments, the *pongamia* oil comprises karanjin. In other embodiments, the *pongamia* oil comprises pongamol. In some embodiments, the *pongamia* oil comprises karanjin and other furanoflavonoids. In some embodiments, the *pongamia* oil comprises at least one or more furanoflavonoids selected from the group consisting of karanjin, pongamol, lanceolatin, kanjone, pongaglabrone, pongaglabol, ovalifolin, sanaganone, pinnatin, gamatin, pongone, glabone, karanjonol, pongapin, pachycarin, pongaglabol methyl ether, isopongaglabol, methoxyisopongaglabol, pongol methyl ether, millettocalyxin, 6-methoxy-isopongaglabol, pongamoside A, pongamoside B, pongananone XI, pongamoside C, glabra I, ovalitenone, ponganone IX, and pongarotene.

In some embodiments, the *pongamia* oil comprises karanjin, pongamol, or a combination thereof. In certain embodiments, the *pongamia* oil comprises karanjin. In other embodiments, the *pongamia* oil comprises pongamol. In certain embodiments, the *pongamia* oil comprises karanjin and pongamol. In some variations, the karanjin and pongamol present in the *pongamia* oil is the intrinsic amount obtained by isolating the oil. In other variations, the karanjin and pongamol present in the oil is the intrinsic amount in the oil further enriched with the addition of external sources of karanjin and/or pongamol.

In some embodiments, the *pongamia* oil comprises at least about 5,000 ppm, at least about 10,000 ppm, or at least about 15,000 ppm karanjin. In other embodiments, the *pongamia* oil comprises less than or equal to about 40,000 ppm, less than or equal to about 30,000 ppm, or less than or equal to about 25,000 ppm karanjin. In still other embodiments, the *pongamia* oil comprises between about 10,000 and about 25,000 ppm karanjin.

In yet other embodiments, the *pongamia* oil comprises at least about 500 ppm, at least about 1,000 ppm, or at least about 2,000 ppm pongamol. In still other embodiments, the *pongamia* oil comprises less than or equal to about 10,000 ppm, less than or equal to about 7,500 ppm, or less than or equal to about 5,000 ppm pongamol. In still other embodiments, the *pongamia* oil comprises between about 1,000 and about 5,000 ppm pongamol.

*Pongamia* oil can be extracted from the oilseeds produced by *pongamia* trees. In some embodiments, the *pongamia* oil is obtained from *pongamia* seed. *Pongamia* oil may be obtained from *pongamia* oilseeds in a variety of ways, including but not limited to mechanical extraction and/or solvent extraction.

In certain embodiments, the *pongamia* oil is obtained by mechanical extraction of *pongamia* seed, for example, including but not limited to extraction with a screw press and/or oil cage. In certain embodiments, the *pongamia* oil is obtained by cold pressing *pongamia* seed. In some embodiments wherein the *pongamia* oil is obtained by cold pressing *pongamia* seed, the extraction temperature is maintained between about 20° C. and about 50° C. In other embodiments, the *pongamia* oil is obtained by mechanical extraction of *pongamia* seed with an expeller press. In certain embodiments, the mechanical extraction of *pongamia* seed with an expeller press comprises extruding the *pongamia* seed under heat. In still further embodiments, the *pongamia* oil is obtained by extruding *pongamia* seed to provide *pongamia* oil and an extruded *pongamia* seedcake, and by further expelling the extruded *pongamia* seedcake to obtain *pongamia* oil. In still yet other embodiments, the *pongamia* oil is obtained by expanding the *pongamia* seed to provide expanded *pongamia* seed, extruding the expanded *pongamia* seed to provide *pongamia* oil and an extruded *pongamia* seedcake, and by further expelling the extruded *pongamia* seedcake to obtain *pongamia* oil. It should be recognized that one or more iterations of the mechanical extraction (e.g., multiple rounds of cold-pressing and/or expeller pressing) may be applied to either the *pongamia* seed and/or the resulting pressed seedcake in order to obtain the *pongamia* oil.

In other embodiments, the *pongamia* oil is obtained by solvent extraction of *pongamia* seed or *pongamia* seedcake, if the *pongamia* seed is first subjected to mechanical extraction methods. Suitable solvents for solvent extraction of *pongamia* oil may include but are not limited to methanol, hexane, and/or esters (also known as alkyl alkanoates). In some variations, methods and solvents for obtaining *pongamia* oil by solvent extraction are described in international application PCT/US2019/054579. In some embodiments, the *pongamia* oil is obtained by solvent extraction of *pongamia* seed with one or more alkyl alkanoate solvents.

In some embodiments, the alkyl of the alkyl alkanoate is methyl, ethyl, propyl, or butyl. In other embodiments, the solvent comprises a methyl alkanoate, an ethyl alkanoate, a propyl alkanoate, or a butyl alkanoate, or any combinations thereof. In certain embodiments, the solvent comprises an ethyl alkanoate. In some embodiments, the alkanoate of the alkyl alkanoate is methanoate, ethanoate, propionate, butanoate, or pentanoate. In other embodiments, the solvent comprises an alkyl methanoate, an alkyl ethanoate, an alkyl propionate, an alkyl butanoate, an alkyl pentanoate, or any combination thereof. In certain embodiments, the solvent comprises an alkyl ethanoate. In certain embodiments, the solvent comprises ethyl acetate. In other embodiments, the solvent is ethyl acetate.

In some embodiments, the solvent comprises an alkyl alkanoate solvent selected from the group consisting of methyl methanoate, methyl ethanoate, methyl propanoate, methyl butanoate, methyl pentanoate, ethyl methanoate, ethyl ethanoate, ethyl propanoate, ethyl butanoate, ethyl pentanoate, propyl methanoate, propyl ethanoate, propyl propanoate, propyl butanoate, propyl pentanoate, butyl methanoate, butyl ethanoate, butyl propanoate, butyl butanoate, and butyl pentanoate, and any combinations thereof. In certain embodiments, the solvent comprises an alkyl alkanoate solvent selected from the group consisting of methyl ethanoate, methyl propanoate, methyl butanoate, ethyl methanoate, ethyl ethanoate, ethyl propanoate, ethyl butanoate, propyl methanoate, propyl ethanoate, propyl propanoate, propyl butanoate, butyl methanoate, butyl ethanoate, butyl propanoate, and butyl butanoate, and any combinations thereof.

In other embodiments, the *pongamia* oil is obtained by solvent extraction of *pongamia* seed or *pongamia* seedcake with an alkyl alkanoate solvent comprising at least one alkyl alkanoate of formula (I):

(I)

wherein
$R^1$ is a $C_1$-$C_4$ alkyl; and
$R^2$ is hydrogen or a $C_1$-$C_4$ alkyl.

In some embodiments, $R^1$ is a $C_1$-$C_4$ alkyl. In other embodiments, $R^2$ is hydrogen or a $C_1$-$C_4$ alkyl. In certain embodiments, $R^1$ and $R^2$ are independently $C_1$-$C_4$ alkyl. In certain other embodiments, $R^1$ is $C_1$-$C_4$ alkyl and $R^2$ is hydrogen.

In some embodiments wherein $R^1$ is a $C_1$-$C_4$ alkyl, $R^1$ is $CH_3$—, $CH_3CH_2$—, $CH_3CH_2CH_2$—, $(CH_3)_2CH$—, $CH_3CH_2CH_2CH_2$—, $CH_3CH_2(CH_3)CH$—, $(CH_3)_2CHCH_2$—, or $(CH_3)_3C$—. In certain embodiments, $R^1$ is $CH_3CH_2$—. In other embodiments, $R^1$ is $CH_3CH_2CH_2CH_2$—. In still other embodiments, $R^1$ is $CH_3CH_2CH_2$—.

In some embodiments, $R^2$ is hydrogen. In other embodiments, $R^2$ is a $C_1$-$C_4$ alkyl. In certain embodiments wherein $R^2$ is a $C_1$-$C_4$ alkyl, $R^2$ is $CH_3$—, $CH_3CH_2$—, $CH_3CH_2CH_2$—, $(CH_3)_2CH$—, $CH_3CH_2CH_2CH_2$—, $CH_3CH_2(CH_3)CH$—, $(CH_3)_2CHCH_2$—, or $(CH_3)_3C$—. In certain embodiments, $R^2$ is hydrogen, $CH_3$—, $CH_3CH_2$—, or $CH_3CH_2CH_2$—.

In still yet other embodiments, $R^1$ is $CH_3CH_2$— and $R^2$ is $CH_3$—. In some embodiments, $R^1$ is $CH_3CH_2$— or $CH_3CH_2CH_2CH_2$—, and $R^2$ is hydrogen. In other embodiments, $R^1$ is $CH_3CH_2CH_2$— and $R^2$ is $CH_3CH_2CH_2$— or $CH_3CH_2CH_2CH_2$—.

In other embodiments, $R^1$ is a $C_1$-$C_3$ alkyl. In yet other embodiments, $R^1$ is methyl, ethyl, n-propyl, or isopropyl. In certain embodiments, $R^1$ is ethyl. In some embodiments, $R^1$ is a $C_2$-$C_4$ alkyl. In certain embodiments, $R^1$ is ethyl, n-propyl, isopropyl, n-butyl, sec-butyl, isobutyl, or t-butyl. In other embodiments, $R^2$ is hydrogen or a $C_1$-$C_3$ alkyl. In certain embodiments, $R^2$ is methyl, ethyl, n-propyl, or isopropyl. In certain embodiments, $R^2$ is methyl. In yet other embodiments, $R^1$ is ethyl and $R^2$ is methyl. In still other embodiments, $R^2$ is hydrogen, ethyl or n-propyl. In yet further embodiments $R^1$ is ethyl, n-propyl, or n-butyl, and $R^2$ is hydrogen, methyl, ethyl, or n-propyl. In certain embodiments, $R^2$ is methyl. In yet other embodiments, $R^1$ is ethyl and $R^2$ is methyl.

In still other embodiments, the *pongamia* oil may be further filtered following extraction from the *pongamia* seed.

Formulations of *Pongamia* Oil

In another aspect, the present disclosure provides a method for controlling black sigatoka in banana plants, comprising administering a formulation comprising *pongamia* oil and at least one suitable inert ingredient. *Pongamia* oil may be formulated with various other (or inert) ingredients in order to facilitate its use in controlling black sigatoka, for example, by promoting its miscibility with water, providing chemical stability, and improving safety of its handling and transport. Examples of suitable ingredients for formulation with *pongamia* oil may include but are not limited to surfactants, adjuvants, stabilizers, safeners, and liquid or solid carriers.

For example, in some embodiments of the foregoing method, the formulation comprises *pongamia* oil in combination with one or more emulsifiers. In certain embodiments, the formulation comprises emulsified *pongamia* oil. In some embodiments, the formulation comprising *pongamia* oil is an emulsion.

Emulsions

In one aspect, provided herein are emulsions comprising *pongamia* oil. As described herein, an emulsion is a mixture of two or more immiscible liquids, such as oil and water. In a two-phase (binary) emulsion, a first liquid (dispersion phase) is dispersed throughout a second liquid phase, or continuous phase. An emulsion may be formed through the process of continuous agitation or mixing to induce physical distribution of one liquid phase in the other continuous liquid phase.

The emulsions comprising *pongamia* oil may be described by their dispersed phases and continuous phases, e.g., an oil-in-water emulsion in which an oil phase is dispersed in a continuous water phase. In some embodiments, the emulsion comprising *pongamia* oil is an oil-in-water emulsion. In other embodiments, the emulsion comprising *pongamia* oil is a water-in-oil emulsion. In still other embodiments, the emulsion comprising *pongamia* oil is a hybrid emulsion.

In some embodiments, provided herein are emulsions comprising *pongamia* oil and water. In other embodiments, provided herein are emulsions comprising *pongamia* oil and one or more emulsifiers. In certain embodiments, provided herein are emulsions comprising *pongamia* oil, one or more emulsifiers and water.

In some embodiments, the emulsion comprising *pongamia* oil has a concentration of at least about 0.1% v/v, at least about 0.5% v/v, at least about 1% v/v, or at least about 2% v/v *pongamia* oil. In other embodiments, the emulsion comprising *pongamia* oil has a concentration of less than or equal to about 10% v/v, less than or equal to about 5% v/v, less than or equal to about 2% v/v, or less than or equal to about 1% v/v *pongamia* oil.

In some embodiments wherein the formulation comprises emulsified *pongamia* oil, the formulation has a concentration of at least about 0.1% v/v, at least about 0.5% v/v, at least about 1% v/v, at least about 2% v/v, or at least about 4% v/v emulsified *pongamia* oil. In other embodiments, the emulsion comprising *pongamia* oil has a concentration of less than or equal to about 5% v/v, less than or equal to 4% v/v, less than or equal to 3% v/v, less than or equal to about 2% v/v, or less than or equal to about 1% v/v emulsified *pongamia* oil.

In some embodiments where the emulsion comprises water, the emulsion has a weight ratio of water to *pongamia* oil of at least about 95:5, at least about 98:2, or at least about 99:1. In other embodiments, the emulsion has a weight ratio of water to *pongamia* oil of less than or equal to about 99:1, less than or equal to about 99.5:0.5, or less than or equal to about 99.9:0.1.

In still other embodiments of the foregoing aspects, the emulsion further comprises one or more organic solvents. Suitable organic solvents may include but are not limited to petroleum-based solvents (such as mineral spirits, turpentine, petroleum distillates, petroleum naphtha), aliphatic hydrocarbon solvents (e.g., hexanes, hexane, octane, pentane), aromatic solvents (e.g., xylene, toluene, benzene), alcohols (e.g., ethanol, isopropanol, hexanol), esters, ethers, or ketones (e.g., acetone, methyl ethyl ketone, cyclohexanone).

In some embodiments, the emulsion comprising *pongamia* oil comprises water. In other embodiments, the emulsion comprising *pongamia* oil comprises one or more organic solvents. In yet other embodiments, the emulsion comprising *pongamia* oil comprises water and one or more organic solvents. In still further embodiments, the emulsion comprising *pongamia* oil comprises water and hexanol. In certain embodiments, the emulsion comprising *pongamia* oil comprises water and 1-hexanol.

In other embodiments wherein the emulsion comprises one or more organic solvents, the weight ratio of *pongamia* oil to the one or more organic solvents is at least about 1:1, at least about 2:1, or at least about 4:1. In other embodiments, the emulsion has a weight ratio of *pongamia* oil to the one or more organic solvents of less than or equal to about 10:1, less than or equal to about 8:1, or less than or equal to about 6:1.

The emulsions of the present disclosure may be characterized by various properties, including, for example, their physical stability over time, average droplet size, color and/or appearance.

Stability of emulsions may be assessed by any number of qualitative and quantitative metrics, including but not limited to light scattering, focused beam reflectance measurement, centrifugation, and rheology, as well as visual observation. Visual assessment of emulsion stability may be conducted by observing the presence or absence of phase separation between the *pongamia* oil and water as a function of time after initial mixing under specified storage conditions. In some embodiments, the emulsion is stable for at least about 30 minutes, at least about 1 hour, at least about 2 hours, at least about 4 hours, at least about 8 hours, at least about 12 hours, at least about 16 hours, at least about 20 hours, at least about 24 hours, at least about 36 hours, at least about 48 hours, at least about 72 hours, at least about 96 hours, or at least about 120 hours after the initial combining of emulsified *pongamia* oil and water at room temperature.

In other embodiments, the emulsions may be characterized by the size of droplets within the emulsion. In some embodiments, the emulsion has an average droplet particle size of at least about 100 nm, at least about 500 nm, or at least about 1 µm. In other embodiments, the emulsion has an average droplet particle size of less than or equal to about 50 µm, less than or equal to about 25 µm, or less than or equal to about 10 µm.

The homogeneity of and/or droplet size of the emulsions comprising *pongamia* oil may be further characterized by visual assessment, including the color and/or translucence of the emulsions. In some embodiments, the emulsion comprising *pongamia* oil is white. In other embodiments, the emulsion comprising *pongamia* oil is opaque.

Emulsifiable Concentrates

In another aspect, provided herein are emulsifiable concentrates comprising *pongamia* oil. An emulsifiable concentrate is a concentrated liquid composition comprising one or more water-immiscible liquids, and one or more emulsifiers. In some embodiments of the present aspect, provided herein are emulsifiable concentrates comprising *pongamia* oil and one or more emulsifiers.

As described above, emulsifiable concentrates can be combined with water to form an emulsion. In agricultural applications, emulsifiable concentrates containing one or more active ingredients (such as insecticides, herbicides, pesticides, and/or fungicides) may be diluted with water to form an emulsion having the desired concentration of the active ingredient(s) prior to crop. In some embodiments, the emulsifiable concentrate comprising *pongamia* oil does not contain water.

In some embodiments, the one or more water-immiscible liquids comprises oil. In certain embodiments, the one or more water-immiscible liquids comprises *pongamia* oil. In other embodiments, the one or more water-immiscible liquids comprises one or more organic solvents. In certain other embodiments, the one or more water-immiscible liquids comprises *pongamia* oil, one or more organic solvents, and any combinations thereof.

*Pongamia* oil may be employed as the sole water-immiscible liquid in the emulsifiable concentrate or, alternatively, may be combined with one or more other oils (e.g., plant- or animal-derived oils) and/or one or more organic solvents. It should be recognized that the emulsifiable concentrates described herein may or may not contain organic solvents. In other embodiments, the emulsifiable concentrate comprising *pongamia* oil comprises one or more organic solvents. In other embodiments, the emulsifiable concentrate comprising *pongamia* oil does not contain organic solvents.

In some embodiments wherein the emulsifiable concentrate comprises one or more organic solvents, the weight ratio of *pongamia* oil to the one or more organic solvents is at least about 1:1, at least about 2:1, or at least about 4:1. In other embodiments, the emulsifiable concentrate has a weight ratio of *pongamia* oil to the one or more organic solvents of less than or equal to about 10:1, less than or equal to about 8:1, or less than or equal to about 6:1.

Emulsifiers

As described herein, formulations comprising *pongamia* oil may include emulsifiable concentrates and emulsions, both of which may comprise one or more emulsifiers. Emulsifiers are a class of amphiphilic compounds that typically possess both a polar (hydrophilic, water-soluble) part and a non-polar (hydrophobic, lipophilic) part. By virtue of their dual nature, emulsifiers are soluble in both polar and non-polar solvents, and such as oil and water, and thus, can mediate and stabilize the interfacial boundary of oil and water in emulsions. Emulsifiers may include naturally occurring and/or synthetic compounds.

Suitable emulsifiers for emulsifiable concentrates and emulsions of *pongamia* oil may be characterized by any number of properties, including but not limited to, their chemical classification, ionicity (such as anionic, cationic, non-ionic, amphoteric), hydrophilic-lipophilic balance value (HLB value, e.g., from 0 to 20), pH, cloud point, and solubility in water and/or various oils, or any combinations thereof.

In some embodiments, the one or more emulsifiers may be characterized by their ionicity. In some embodiments, the one or more emulsifiers comprises one or more anionic emulsifiers, one or more cationic emulsifiers, one or more non-ionic emulsifiers, or one or more amphoteric emulsifiers, or any combinations thereof. In certain embodiments, the one or more emulsifiers comprise one or more non-ionic emulsifiers.

In some embodiments, the one or more emulsifiers are selected from the group consisting of fatty acid alkoxylates, fatty alcohol alkoxylates (including, for example, fatty alcohol ethoxylates), polysorbate (polyoxyethylene sorbitan) fatty acid esters, silicon-based or organosilicones, polyethylene oxide block copolymers, ethoxylated amines and fatty acid amines. In certain embodiments, the one or more emulsifiers comprises a fatty alcohol alkoxylate. In other embodiments, the one or more emulsifiers comprises a polysorbate fatty acid ester. In some embodiments, the one or more emulsifiers are selected from the group consisting of fatty alcohol alkoxylates and polysorbate (polyoxyethylene sorbitan) fatty acid esters.

In other embodiments, the one or more emulsifiers independently have an HLB value of between about 0 and about 20. In certain embodiments, at least one of the one or more emulsifiers has an HLB value of between about 3 and about 16, between 3 and 6, or between about 8 and about 16. In some embodiments wherein the emulsion comprises at least one emulsifier having an HLB value of between about 3 and about 6, the emulsion is a water-in-oil emulsion. In other embodiments wherein the emulsion comprises at least one emulsifier having an HLB value of between about 8 and about 16, the emulsion is an oil-in-water emulsion.

In some embodiments, the weight ratio of *pongamia* oil to the one or more emulsifiers in the emulsifiable concentrate is at least about 5:1, at least about 6:1, at least about 7:1, or at least about 8:1. In other embodiments, the weight ratio of *pongamia* oil to the one or more emulsifiers in the emulsifiable concentrate is less than or equal to about 15:1, less than or equal to about 12:1, less than or equal to about 10:1, or less than or equal to about 9:1. In some embodiments, the weight ratio of *pongamia* oil to the one or more emulsifiers in the emulsifiable concentrate is between about 5:1 and about 15:1, between about 10:1 and 15:1, between about 5:1 and 10:1, or between about 7:1 and about 9:1.

In some embodiments, the weight ratio of *pongamia* oil to the one or more emulsifiers in the emulsion is at least about 5:1, at least about 6:1, at least about 7:1, or at least about 8:1. In other embodiments, the weight ratio of *pongamia* oil to the one or more emulsifiers in the emulsion is less than or equal to about 15:1, less than or equal to about 12:1, less than or equal to about 10:1, or less than or equal to about 9:1. In some embodiments, the weight ratio of *pongamia* oil to the one or more emulsifiers in the emulsion is between about 5:1 and about 15:1, between about 10:1 and 15:1, between about 5:1 and 10:1, or between about 7:1 and about 9:1.

Additional Formulation Ingredients

In addition to the one or more emulsifiers, the emulsifiable concentrates and emulsions described herein may further comprises one or more additional components suitable for agricultural formulations. In some embodiments, the emulsifiable concentrates and emulsions as provided in the present disclosure may further comprise one or more additives, such as stabilizers, adjuvants, synergists, extenders, stickers, penetrants, safeners, spreaders, thickeners, wetting agents, and dyes. It should also be recognized that the formulations as described herein may other pesticides, herbicides, fungicides, insecticides in combination with *pongamia* oil.

Methods of Preparing Emulsifiable Concentrates and Emulsions

In one aspect, provided herein is a method for preparing an emulsifiable concentrate comprising *pongamia* oil. In some embodiments, the method for preparing an emulsifiable concentrate comprising *pongamia* oil comprises combining *pongamia* oil, and one or more emulsifiers, and optionally one or more organic solvents, to provide the emulsifiable concentrate.

In yet another aspect, provided herein is a method for preparing an emulsion comprising *pongamia* oil. In some embodiments, the method for preparing an emulsion comprising *pongamia* oil comprises combining *pongamia* oil, one or more emulsifiers, and water, and optionally one or more organic solvents, to provide the emulsion. In other embodiments, the method comprises combining *pongamia* oil and one or more emulsifiers, and optionally one or more organic solvents to provide an emulsifiable concentrate, and combining the emulsifiable concentrate with water to provide the emulsion.

It should be recognized that the methods of preparing the emulsifiable concentrates and emulsions comprising *pongamia* oil may further comprise obtaining and/or pre-treating the *pongamia* oil to be used in the emulsifiable concentrates and emulsions. In still further embodiments of the foregoing aspects, the methods may comprise obtaining *pongamia* oil from *pongamia* seed prior to combining the *pongamia* oil with other components of the emulsifiable concentrates or emulsions. In some embodiments, the methods comprise mechanically extracting *pongamia* seeds to obtain *pongamia* oil. In other embodiments, the methods comprise cold-pressing *pongamia* seeds to obtain *pongamia* oil. In certain embodiments, the methods comprise cold-pressing *pongamia* seeds at a temperature of between 20° C. and 50° C. to obtain *pongamia* oil. In still other embodiments, the methods comprise obtaining *pongamia* oil by mechanical extraction of *pongamia* seed with an expeller press and/or expander. In still yet other embodiments, the methods comprise obtaining *pongamia* oil by solvent extraction of *pongamia* seed, such as with an alkyl alkanoate solvent as described herein.

In still other embodiments of the foregoing, the methods may further comprise filtering the *pongamia* oil prior to combining the *pongamia* oil with other components of the emulsifiable concentrates or emulsions.

It should be recognized that combining *pongamia* oil with the other components of the emulsifiable concentrates and emulsions may include various modes of agitation such as mixing, stirring, shaking, inverting, homogenizing, or exposing to ultrasound in order and to ensure uniformity of the resulting emulsifiable concentrates and emulsions, or, in the case of emulsions, to provide sufficient energy and shear force in order for emulsification to occur. In some embodiments, agitation includes mixing or stirring. In certain embodiments, the agitation is continuous or intermittent. In still other embodiments, the combining *pongamia* oil with the other components of the emulsifiable concentrates and emulsions does not include agitation but are allowed to passively mix. In some embodiments, the combining *pongamia* oil with the other components of the emulsifiable concentrates and emulsions comprises passive mixing.

In other embodiments, the steps of the present methods are performed in one or more vessels capable of agitating or passively mixing the *pongamia* oil and other components of the emulsifiable concentrates and emulsions described herein. For example, in some embodiments, the method of preparing an emulsion comprising *pongamia* oil comprises combining *pongamia* oil, one or more emulsifiers, and water, and optionally one or more organic solvents, in a spray tank, to provide the emulsion. In other embodiments, the method of preparing an emulsion comprising *pongamia* oil comprises combining an emulsifiable concentrate, and water, and optionally one or more organic solvents, in a spray tank, to provide the emulsion.

Moreover, the individual components, including the *pongamia* oil, one or more emulsifiers, one or more organic solvents, and water may be agitated prior to combining with other components of the emulsifiable concentrates and emulsions. For example, in some embodiments, the *pongamia* oil and one or more organic solvents, if included, are separately stirred prior to being combined. It should be further recognized that the preparation of the emulsifiable concentrates and/or emulsions may comprise sequential addition of each individual component, and that the order of addition of each component to form either of the emulsifiable concentrate or emulsion may be varied.

It should further be acknowledged that the methods for preparing the emulsions and emulsifiable concentrates may be adjusted with respect to the processing conditions under which the components are combined. The processing conditions of the methods for preparing the emulsions and emulsifiable concentrates as described herein including, but not limited to, mixing temperature, mixing times, and stir rates (rpm) may be especially important to the preparation of emulsions and emulsifiable concentrates having the desired uniformity and/or stability.

For example, the temperature at which the emulsion is prepared in the present disclosure may be controlled to produce the desired emulsion characteristics. In some embodiments of the method for preparing an emulsifiable concentrate comprising *pongamia* oil, the *pongamia* oil, the one or more emulsifiers, and optionally one or more organic solvents are combined at room temperature (from about 20° C. to about 25° C.). In other embodiments, the *pongamia* oil, the one or more emulsifiers, and optionally one or more organic solvents are combined at a temperature between about 20° C. and about 50° C., to provide the emulsifiable concentrate.

In other embodiments of the method for preparing an emulsion comprising *pongamia* oil, the *pongamia* oil, the one or more emulsifiers, water, and optionally one or more organic solvents are combined at room temperature (from about 20° C. to about 25° C.). In other embodiments, the *pongamia* oil, the one or more emulsifiers, water and optionally one or more organic solvents are combined at a temperature between about 20° C. and about 50° C., to provide the emulsion. In still other embodiments of the method for preparing an emulsion comprising *pongamia* oil, the emulsifiable concentrate and water are combined at room temperature (about from about 20° C. to about 25° C.). In other embodiments, the emulsifiable concentrate and water are combined at a temperature between about 20° C. and about 50° C., to provide the emulsion.

Methods for Controlling Black Sigatoka in Banana Plants

In one aspect, provided herein are methods for controlling black sigatoka in banana plants comprising applying *pongamia* oil to one or more parts of the banana plants. In some embodiments, the *pongamia* oil is an emulsified *pongamia* oil. In some embodiments, the *pongamia* oil is formulated as an emulsion.

In another aspect provided herein are methods for controlling black sigatoka in banana plants comprising applying a formulation comprising *pongamia* oil to the banana plants. In some embodiments, the formulation comprises one or more emulsifiers. In some embodiments, the formulation comprising *pongamia* oil is an emulsion.

In some embodiments of the foregoing methods, the method comprises preparing the emulsion comprising *pongamia* oil prior to applying the emulsion to the banana plants. For example, in certain embodiments, the method comprises combining an emulsifiable concentrate comprising *pongamia* oil with water to provide an emulsion comprising *pongamia* oil, and applying the emulsion to the banana plants.

In some embodiments wherein the formulation comprises *pongamia* oil and one or more emulsifiers, the formulation may be said to comprise emulsified *pongamia* oil. In certain embodiments wherein the *pongamia* oil is an emulsified *pongamia* oil, the formulation may comprise at least about 0.1% v/v, at least about 0.5% v/v, at least about 1% v/v, at least about 2% v/v, or at least about 4% v/v of the emulsified *pongamia* oil. In other embodiments, the formulation comprises less than or equal to about 5% v/v, less than or equal to 4% v/v, less than or equal to 3% v/v, less than or equal to about 2% v/v, or less than or equal to about 1% v/v emulsified *pongamia* oil.

In some embodiments of the foregoing wherein the *pongamia* oil being applied is formulated as an emulsion or the formulation comprising *pongamia* oil being applied is an emulsion, the emulsion may be an oil-in-water emulsion. In other embodiments, wherein the *pongamia* oil being applied is formulated as an emulsion or the formulation comprising *pongamia* oil being applied is an emulsion, the emulsion is a water-in-oil emulsion.

It should be acknowledged that the term "control" or "controlling" as it pertains to the control of black sigatoka in banana plants may include inhibiting or reducing the growth, germination, reproduction, and/or proliferation of *Mycosphaerella fijiensis*; and/or diminishing the occurrence and/or activity of *Mycosphaerella fijiensis*. As such, a plant treated with *pongamia* oil or formulations thereof as provided herein may show a reduced disease severity or reduced disease development in the presence of black sigatoka by a statistically significant amount. Control of black sigatoka as described herein may encompass treatment of existing infections by *Mycosphaerella fijiensis* and/or prevention of infections by *Mycosphaerella fijiensis* in advance of its proliferation on the plant of interest. The terms "treat" and "treating" include substantially inhibiting, slowing, or reversing the progression of a condition, substantially ameliorating symptoms of a condition or substantially preventing the appearance of symptoms or conditions brought about by the *Mycosphaerella fijiensis*. In some embodiments, the methods described herein for the control of black sigatoka are methods for treatment of black sigatoka in banana plants. In such instances, for example, methods of treatment may provide an ameliorative or curative effect to symptoms of leaf spot or streak in plants infected with black sigatoka. In other embodiments, the methods for the control of black sigatoka are methods for prevention of black sigatoka in banana plants. For example, the methods described herein may provide preventive or protective effect against possible infection of banana plants by *Mycosphaerella fijiensis*. The terms "prevent" and "preventing" include countering in advance of growth, proliferation, infestation, spore germination, and hyphae growth of *Mycosphaerella fijiensis*. In instances of preventive application, the *pongamia* oil or formulation thereof is applied before exposure to the *Mycosphaerella fijiensis*. It should be understood that black sigatoka disease, black leaf streak, and any other names recognized in the art for a disease in bananas caused by *Mycosphaerella fijiensis* may be used interchangeably.

As described in the present disclosure, the term "banana" includes cooking bananas (plantains) and dessert bananas. It should be further recognized, banana plants as described herein may encompass any plant of the genus *Musa*, without limitation, including all cultivars, groups and subgroups therein. In some embodiments, the banana plant may be a certain cultivar or subgroup of bananas. For example, in certain embodiments, the banana plant may be a cultivar of the Cavendish group.

In some embodiments, the method of controlling black sigatoka in banana plants comprises applying *pongamia* oil or a formulation thereof to the leaves of the banana plants. In other embodiments, the method comprises applying the *pongamia* oil or the formulation thereof to the soil in or around which the banana plant grows.

In some embodiments, the methods comprise applying the *pongamia* oil or the formulation comprising *pongamia* oil to the banana plants by spraying. In certain embodiments wherein the *pongamia* oil is applied to the leaves of the banana plant, the *pongamia* oil may be applied by foliar spray application. In some embodiments, the spraying is achieved by aerial spray or by spray with a mist blower.

In still some embodiments of the foregoing methods, the application of the formulation comprising *pongamia* oil may be characterized by the volume of formulation applied to a given acreage or number of plants. For example, in some embodiments, the formulation comprising *pongamia* oil is applied at a volume of at least 50 gallons per acre, at least 75 gallons per acre, or at least 100 gallons per acre.

In some embodiments of the foregoing, the methods may encompass application rates of *pongamia* oil and/or the formulations thereof in order to achieve specified application rates (e.g., ppm, grams of active ingredient per hectare (g/ha)) of active chemical constituents, such as karanjin and/or pongamol, to the banana plants.

In some embodiments of the foregoing methods, the use of *pongamia* oil and formulations thereof may reduce the frequency of application of antifungal treatments to combat black sigatoka infestation. In some embodiments of the foregoing, the method comprises applying *pongamia* oil or a formulation thereof at an application frequency of less than or equal to 50 times per year, less than or equal to 25 times per year, or less than or equal to 12 times per year. In other embodiments, the method comprises applying *pongamia* oil or a formulation thereof at an application frequency of at least once per month, at least twice per month, or at least four times per month.

In some embodiments of the foregoing methods, the banana plants, plant parts, or areas of cultivation treated with *pongamia* oil or the formulations thereof provided herein may show a reduced disease severity or reduced disease development in the presence of black sigatoka by a statistically significant amount. Disease severity may be characterized by, for example, the presence of spots/streaks on affected leaves, the total area coverage of spots on affected leaves, etc. In some embodiments, the disease severity of black sigatoka on banana plants is determined as a percentage of the total leaf area affected, on a scale from 0% to 100%.

In some embodiments, the banana plants to which the *pongamia* oil or formulations comprising *pongamia* oil are applied may show a reduced disease severity of about 10% to about 20%, about 20% to about 30%, about 30% to about 40%, about 40% to about 50%, about 50% to about 60%, about 60% to about 70%, about 70% to about 80%, about 80% to about 90%, or about 90% to about 100% when compared to infected, untreated control plants. In other embodiments, the banana plants to which the *pongamia* oil or formulations comprising *pongamia* oil are applied may show a reduced disease severity or reduced disease development in the presence of black sigatoka of at least about 10%, at least about 15%, 16%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% when compared to infected, untreated control plants. In certain embodiments, the methods provided herein may reduce disease severity of black sigatoka in infected banana plants by at least 40%, at least 50%, at least 60% at least 70% at least 80% or at least 90% as compared to infected, untreated control banana plants.

In still further embodiments, the methods of the present disclosure may increase the average percent control of disease over time in infected banana plants, as compared to infected, untreated control banana plants. In some embodiments, the banana plants to which the *pongamia* oil or formulations comprising *pongamia* oil are applied may show an increase in the average percent control of disease severity over time in infected banana plants of about 10% to about 20%, about 20% to about 30%, about 30% to about 40%, about 40% to about 50%, about 50% to about 60%, about 60% to about 70%, about 70% to about 80%, about 80% to about 90%, or about 90% to about 100% when compared to infected, untreated control plants. In other embodiments, the banana plants to which the *pongamia* oil or formulations comprising *pongamia* oil are applied may show an increase in the average percent control of disease severity over time of at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% when compared to infected, untreated control plants. In certain embodiments, the methods provided herein may increase the control of disease severity of black sigatoka in infected banana plants by at least 40%, at least 50%, at least 60% at least 70% at least 80% or at least 90% as compared to infected, untreated control banana plants.

In other embodiments, the reduction in disease severity may be characterized with respect to disease severity observed with application of standard grower fungicides for *Mycosphaerella fijiensis*. Standard grower treatments for controlling black sigatoka infection may include but is not limited to commercially available fungicides, such as propiconazole. In some embodiments, the banana plants to which the *pongamia* oil or formulations comprising *pongamia* oil are applied may show statistically similar disease severity as compared to banana plants treated with standard grower fungicide(s). In other embodiments, the banana plants to which the *pongamia* oil or formulations comprising *pongamia* oil are applied may show a further reduction in disease severity as compared to banana plants treated with standard grower fungicide(s).

In still other embodiments, the banana plants to which the *pongamia* oil or formulations comprising *pongamia* oil are applied may show statistically similar disease severity as compared to banana plants treated with propiconazole. In other embodiments, the banana plants to which the *pongamia* oil or formulations comprising *pongamia* oil are applied may show a further reduction in disease severity as compared to banana plants treated with propiconazole.

In yet further embodiments, the methods of the present disclosure may increase the average percent control of disease over time in infected banana plants treated with *pongamia* oil or formulations thereof, as compared to infected banana plants treated with grower standard fungicide(s). In some embodiments, the banana plants to which the *pongamia* oil or formulations comprising *pongamia* oil are applied may show an increase in the average percent control of disease severity over time in infected banana plants of about 10% to about 20%, about 20% to about 30%, about 30% to about 40%, about 40% to about 50%, about 50% to about 60%, about 60% to about 70%, about 70% to about 80%, about 80% to about 90%, or about 90% to about 100% when compared to banana plants treated with grower standard fungicide(s). In other embodiments, the banana plants to which the *pongamia* oil or formulations comprising *pongamia* oil are applied may show an increase in the average percent control of disease severity over time of at least about 10%, at least about 15%, 16%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% when compared to banana plants treated with grower standard fungicide(s). In certain embodiments, the methods provided herein may increase the control of disease severity of black sigatoka in infected banana plants by at least 40%, at least 50%, at least 60% at least 70% at least 80% or at least 90% when compared to banana plants treated with grower standard fungicide(s).

In yet other embodiments wherein the standard grower fungicide is propiconazole, the banana plants to which the *pongamia* oil or formulations comprising *pongamia* oil are applied may show an increase in the average percent control of disease severity over time in infected banana plants of about 10% to about 20%, about 20% to about 30%, about 30% to about 40%, about 40% to about 50%, about 50% to about 60%, about 60% to about 70%, about 70% to about 80%, about 80% to about 90%, or about 90% to about 100% when compared to banana plants treated with propiconazole. In other embodiments, the banana plants to which the *pongamia* oil or formulations comprising *pongamia* oil are applied may show an increase in the average percent control of disease severity over time of at least about 10%, at least about 15%, 16%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% when compared to banana plants treated with propiconazole. In certain embodiments, the methods provided herein may increase the control of disease severity of black sigatoka in infected banana plants by at least 40%, at least 50%, at least 60% at least 70% at least 80% or at least 90% when compared to banana plants treated with propiconazole.

In still other aspects, provided herein is an article of manufacture, such as a container or kit, comprising an emulsion comprising *pongamia* oil or an emulsifiable concentrate comprising *pongamia* oil as described herein, and a label containing instructions for use of such emulsions and/or such emulsifiable concentrates for application in control of black sigatoka in banana plants. In certain embodiments, provided herein is article of manufacture, such as a container or kit, comprising an emulsifiable concentrate comprising *pongamia* oil as described herein, and a label containing instructions for use of the emulsifiable concentrate for preparation of an emulsion and for application of the emulsion for the control of black sigatoka in banana plants.

EXAMPLES

The presently disclosed subject matter will be better understood by reference to the following Example, which is provided as exemplary of the invention, and not by way of limitation.

Example 1

Preparation of *Pongamia* Oil Emulsifiable Concentrates

*Pongamia* oil was obtained by cold-pressing *pongamia* oilseeds with an expeller press, while maintaining the temperature at less than 50° C. The resulting cold-pressed *pongamia* oil was decanted or filtered with filter press to remove solid particulate matter. The resulting cold-pressed, filtered *pongamia* oil was formulated into two emulsifiable concentrates as shown in the Tables 1 and 2 below.

TABLE 1

Emulsifiable Concentrate #1

| Ingredient | % w/w |
|---|---|
| Cold-pressed pongamia oil | 90 |
| non-ionic, fatty alcohol alkoxylate | 10 |

Emulsifiable Concentrate #1. The cold-pressed *pongamia* oil was weighed out in a mixing vessel. While the *pongamia* oil was agitated, the emulsifier was added to the mixing vessel.

TABLE 2

Emulsifiable Concentrate #2

| Ingredient | % w/w |
|---|---|
| Cold-pressed pongamia oil | 75 |
| 1-hexanol | 15 |
| non-ionic, polyoxyethylene (20) sorbitan monolaurate (polysorbate 20) | 7 |
| non-ionic, polyoxyethylene (12) sorbitan monolaurate (polysorbate) | 3 |

Emulsifiable Concentrate #2. The cold-pressed *pongamia* oil was weighed out in a mixing vessel. A second formulation of *pongamia* oil using a combination of surfactants was also prepared. Cold-pressed, filtered *pongamia* oil was weighed out into a mixing vessel and agitated. While the *pongamia* oil was being agitated, 1-hexanol was added to the same mixing vessel and further agitated to incorporate. The first surfactants Tween® 20 was added into the mixing vessel and agitated, followed by further addition of Tween® 23-LQ into the mixing vessel and subsequent agitation. The addition and agitation of the mixture was carried out at ambient (room temperature) conditions.

Example 2

Preparation of *Pongamia* Oil Emulsion

The emulsifiable concentrate #1 (Example 1) was further evaluated for stability in an oil-in-water emulsion. The emulsifiable concentrate (EC) was added to water at a weight ratio of water: EC 9:1. Upon addition, the combination of emulsifiable concentrate and water exhibited an initial bloom. The combination was inverted (30 inversions) in a sealed Eppendorf tube to mix. Following agitation, the mixture was allowed to sit. The mixture was observed to form a homogenous emulsion after agitation and was stable (exhibited no phase separation) 5 days (120 hours) after the initial mixing.

Example 3

Comparison Study for Treatment of Black Sigatoka in Banana Plants

The efficacy *pongamia* oil for the control of black sigatoka in banana plants was evaluated as compared to treatment with a grower standard fungicide.

Three different treatments were utilized in the study, including (1) an untreated check (no treatment) as a control, (2) *pongamia* oil in an emulsion, and (3) propiconazole (Tilt, Syngenta) as a grower standard.

*Pongamia* oil was provided as an emulsifiable concentrate (formulated in accordance with emulsifiable concentrate #1 from Example 1) at 90:10 weight ratio of oil to emulsifier. The emulsified *pongamia* oil was prepared as an oil-in-water emulsion at a 1% v/v concentration for foliar spray application to the banana plants. As a grower standard, propiconazole was selected and applied to banana plants at an application rate of 3 fl. oz./a.

The study was conducted on banana plants grown in single 3-gallon pots in Thonotosassa, FL. Treatments were replicated eight times (n=8) in a randomized complete block design. Climate data (rainfall, minimum and maximum temperature, average temperature, and relative humidity) were recorded daily throughout the study.

One foliar application of either the *pongamia* oil emulsion or propiconazole was made to the banana trees using a backpack mist blower sprayer with a single nozzle. The spray volume was 100 gallons per acre, and the mix size was 7.9 liters. Following the application of the *pongamia* oil emulsion or propiconazole, the leaves of the untreated and treated banana plants were inoculated with a black sigatoka spore solution. Disease severity ratings for black sigatoka were recorded on a 0-100% pest severity scale based on affected leaf area (100% indicating the entire leaf area is affected; i.e., a very severe infestation) at six separate time points—4 days after the initial date of the foliar application (4 days after application, or 4 DA-A), 8 days after (8 DA-A), 15 days after (15 DA-A), 19 days after (19 DA-A), 23 days after (23 DA-A), and 27 days after (27 DA-A)—in order to observe disease progression across the different treatments.

Average disease severity, standardized area under the disease progress curve (SAUDPC) and Abbott's control were calculated from the raw count data and analyzed using ANOVA with Bartlett's LSD mean separation test at $\alpha=0.05$.

Table 3 and FIG. 1 show the average disease severity (rated on a 0-100% scale of affected leaf area) of black sigatoka on the foliage of the banana plants (n=8), as assessed at the six time points in the study.

TABLE 3

| Trt No. | Treatment Name | 4 DA-A | | 8 DA-A | | 15 DA-A | | 19 DA-A | | 23 DA-A | | 27 DA-A | |
|---|---|---|---|---|---|---|---|---|---|---|---|---|---|
| 1 | Untreated Check | 0.00 | a | 15.63 | a | 33.75 | a | 48.13 | a | 55.63 | a | 60.00 | a |
| 2 | Pongamia Oil (emulsion) 1% v/v | 0.00 | a | 1.25 | b | 6.25 | b | 7.50 | b | 10.63 | b | 11.88 | b |
| 3 | Tilt 3 fl. oz./a | 1.25 | a | 3.13 | b | 11.25 | b | 13.75 | b | 15.63 | b | 16.25 | b | a, b Means followed by same letter or symbol do not significantly differ (P = .05, LSD)

From the recorded disease severity for the six time points for each treatment, the standardized area under the disease progress curve (standardized AUDPC) was determined. AUDPC calculates the average disease intensity between each pair of adjacent time points. The formula below was used to the AUDPC by determining the average distance in rise of disease intensity for each evaluation date and adding them together by treatment:

$$\sum_{i=1}^{N_{i-1}} \frac{y_i - y_{i-1}}{2} (t_i - t_{i-1}),$$

where y=severity, t=time, N=average disease intensity between two adjacent time points.

The standardized AUDPC was further calculated using the below equation:

$$SAUDPC = \frac{AUDPC}{days}.$$

SAUDPC values are an average of the disease severity over time. Functionally, SAUDPC is the average AUDPC per day.

Figure 2:
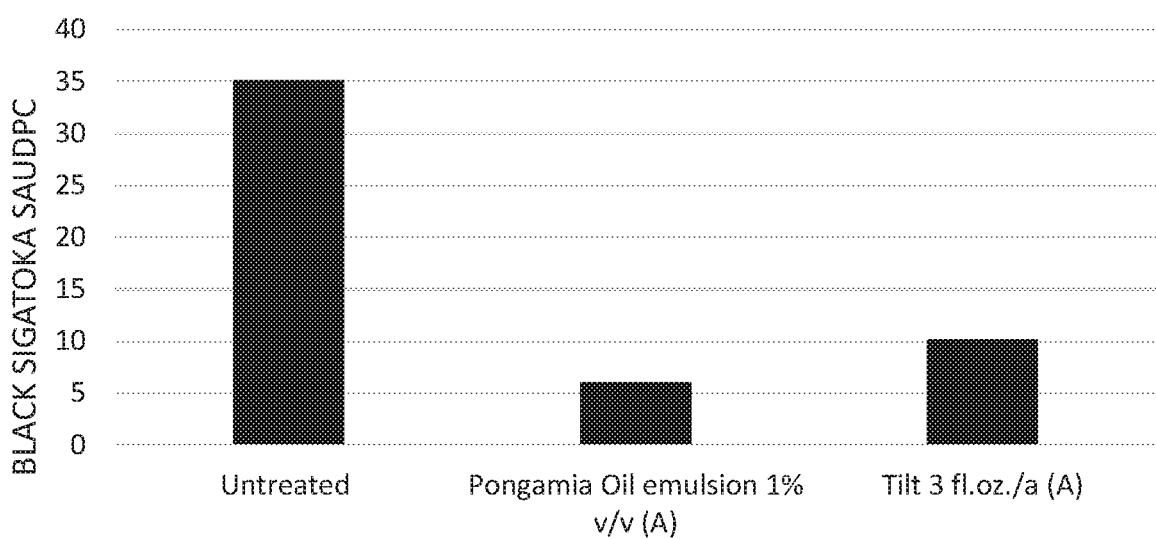
FIG. 2 depicts average disease severity over time, as the standardized area under the disease progress curve (SAUDPC, area under the disease progress curve per day), of black sigatoka in the banana plants observed for various treatments, including an untreated check (control), *pongamia* oil (emulsion) treatment, and a grower standard treatment (propiconazole).

Table 4 and FIG. 2 show the average disease severity over time for the six assessments of black sigatoka in the banana plants, as the standardized area under the disease progress curve (SAUDPC).

TABLE 4

| Trt No. | Treatment Name | SAUDPC | |
|---|---|---|---|
| 1 | Untreated Check | 35.07 | a |
| 2 | Pongamia Oil (emulsion) 1% v/v | 5.98 | b |
| 3 | Tilt 3 fl. oz./a | 10.07 | b | a, b Means followed by same letter or symbol do not significantly differ (P = .05, LSD)

From the SAUDPC values calculated for each of the three treatments, the percent control of disease severity was also determined. The percent control was calculated using the Abbott formula below and expresses the severity of fungal disease infection in treated plots, compared to plants in the untreated check:

$$\text{Corrected \%} = \left(1 - \frac{n \text{ in } T \text{ after treatment}}{n \text{ in } Co \text{ after treatment}}\right) * 100$$

where: n=disease pressure, T=treated, Co=control.

Figure 3:
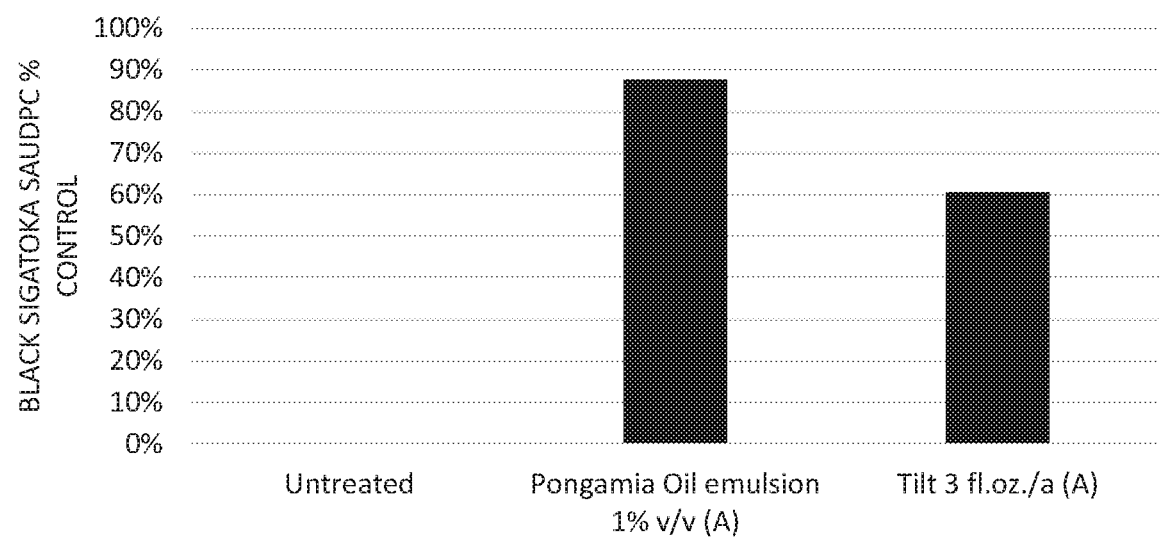
FIG. 3 depicts the average percent (%) control of disease severity over time (SAUDPC) of the *pongamia* oil (emulsion) treatment and a grower standard (propiconazole) treatment relative to an untreated check (0%).

Table 5 and FIG. 3 show the average percent control of disease severity over time (SAUDPC) relative to the untreated check.

TABLE 5

| Trt No. | Treatment Name | 27 DA-A % Control | |
|---|---|---|---|
| 1 | Untreated Check | 0.00% | b |
| 2 | Pongamia Oil (emulsion) 1% v/v | 87.50% | a |
| 3 | Tilt 3 fl. oz./a | 60.33% | a | a, b Means followed by same letter or symbol do not significantly differ (P = .05, LSD)

Both treatments with the *pongamia* oil emulsion and the grower standard propiconazole showed effective control of black sigatoka on the banana plants tested. The *pongamia* oil emulsion was as statistically effective against black sigatoka as the grower standard. Plants treated with the *pongamia* oil emulsion averaged lowest disease severity ratings on every evaluation date, with the untreated check averaging significantly higher ratings for the final five evaluation time points.

What is claimed is:

1. A method for controlling black sigatoka in a banana plant, comprising:
    applying *pongamia* oil to the banana plant.

2. The method of claim 1, wherein the *pongamia* oil is formulated as an emulsion.

3. The method of claim 2, wherein the emulsion comprises:
    one or more non-ionic emulsifiers;
    water; and
    optionally one or more organic solvents.

4. The method of claim 2, wherein the emulsion comprises *pongamia* oil at a concentration of at least 1% v/v, and the weight ratio of *pongamia* oil to the one or more emulsifiers is between 7:1 and 9:1.

5. The method of claim 1, wherein the *pongamia* oil is applied to the banana plant by spraying.

6. The method of claim 1, wherein the *pongamia* oil is applied to the leaves of the banana plant.

7. A method for controlling black sigatoka in a banana plant, comprising:
    applying a formulation comprising *pongamia* oil to the banana plant.

8. The method of claim 7, wherein the *pongamia* oil is an emulsified *pongamia* oil.

9. The method of claim 7, wherein the formulation comprises one or more non-ionic emulsifiers.

10. The method of claim 9, wherein the one or more emulsifiers are selected from the group consisting of fatty alcohol alkoxylates and polysorbate (polyoxyethylene sorbitan) fatty acid esters.

11. The method of claim 7, wherein the formulation is an emulsion.

12. The method of claim 7, wherein the formulation is an oil-in-water emulsion.

13. The method of claim 7, wherein the formulation is applied by spraying.

14. The method of claim 7, wherein the formulation is applied to the leaves of the banana plant.

15. The method of claim 7, wherein the *pongamia* oil is an emulsified *pongamia* oil and the formulation comprises the emulsified *pongamia* oil at a concentration of at least 1% v/v.

\* \* \* \* \*